United States Patent [19]
Williams

[11] 3,966,970
[45] June 29, 1976

[54] METHOD FOR PACKAGING A UNIQUE CHEESE ITEM

[75] Inventor: Murray John Williams, Syracuse, N.Y.

[73] Assignee: Borden, Inc., Columbus, Ohio

[22] Filed: June 6, 1974

[21] Appl. No.: 477,015

[52] U.S. Cl. ................ 426/393; 426/516; 426/130; 53/227
[51] Int. Cl.[2] ................ A23C 11/14
[58] Field of Search ........... 426/393, 516, 518, 524, 426/130, 410, 414, 515; 53/25, 122, 227

[56] References Cited

UNITED STATES PATENTS

| | | | |
|---|---|---|---|
| 2,228,492 | 1/1941 | Wetherbee | 426/412 |
| 2,598,137 | 5/1952 | Schulz | 426/393 |
| 2,816,036 | 12/1957 | Lederel | 426/524 |
| 2,875,567 | 3/1959 | Brook | 53/227 X |
| 2,876,111 | 3/1959 | Holzcker | 426/515 X |
| 3,637,398 | 1/1972 | Eleruth | 426/515 X |
| 3,727,308 | 4/1973 | Ross | 420/516 |
| 3,732,114 | 5/1973 | Field | 420/524 |
| 3,761,284 | 9/1973 | Foster | 426/516 |
| 3,797,198 | 3/1974 | Fukusyk | 53/227 |

FOREIGN PATENTS OR APPLICATIONS

| | | | |
|---|---|---|---|
| 676,641 | 12/1963 | Canada | 426/576 |

*Primary Examiner*—Robert Halper
*Attorney, Agent, or Firm*—George A. Kap; George P. Maskas; Daniel D. Mast

[57] ABSTRACT

A method of packaging bite-size pieces of a cheese product which includes heating the ingredients to a molten state with mixing, and then cooling and extruding the product under pressure in a continuous bar or rope at about 40° to 60°F. Thereafter subjecting it to shock cooling in a tunnel having a temperature in the range −100° to 0°F., by rapidly moving the bar through the tunnel so that it exits at a temperature in the range of 10° to 30°F. The bar is finally cut into bite-size pieces and individually packaged for the consumer at a rate of several hundred per minute.

8 Claims, No Drawings

METHOD FOR PACKAGING A UNIQUE CHEESE ITEM

BACKGROUND AND DESCRIPTION OF THE INVENTION

The subject invention is directed toward the art of food processing and, more particularly, to an improved method for preparing and wrapping a cheese product in bite-size pieces using a conventional high-speed cutting and wrapping machine of the type used to wrap candy kisses.

In the past, attempts have been made to produce wrapped, bite-size pieces of cheese products. One suggested process included extruding a bar of process cheese, severing to bite-size lengths and packaging several such length together. This is more fully described in the Foster et al. U.S. Pat. No. 3,761,284. Another such attempt involved the continuous extrusion of the cheese product into an elongated bar, subsequently chilling the bar in a freezer at 10° to 20°F. or at −10°F. for an extended period of time, as long as 12 hours or more. After being cooled, the cheese product was cut into bite-size pieces and wrapped. The cutting and wrapping centered about the use of the high-speed cutting and wrapping machine of the type used for processing candy kisses.

These prior approaches were unsatisfactory as well as impractical for production purposes. With the extended refrigeration it was difficult to control the texture and it did not consistantly have the proper machinability characteristics for high-speed operation of the cutting and wrapping machine. Over 50% of the product produced on the high-speed machine had to be repackaged by hand. As is obvious, this was totally unacceptable from an economic standpoint.

The subject invention overcomes the above problems and provides a method for preparing the cheese product in a condition such that it can be readily handled by the high-speed cutting and wrapping machine. In general, the method comprises preparing the cheese product in a conventional manner and then cooling it to a range of approximately 40° to 60°F. Thereafter, the cooled product is directed through a sectioned extrusion head maintained throughout at a temperature in the range of 90° to 110°F., except for the throat of the nozzle which is heated to the range of 100° to 140°F. The temperature in the throat causes the surface of the cheese product to become slippery from oil released from the product.

The extruder is operated to produce an elongated rod or rope of a desired size. The extruded rope is thereafter suddenly cooled to reduce its temperature to a range of from 10° to 30°F. Preferably, it is cooled to the range of 15° to 22°F. When shock cooled to this range, the rope of cheese product has a frozen consistency although it is still somewhat pliable. In this state, the product can be cut and wrapped at an extremely high rate with particularly good results.

As used in the subject specification and claims, the term "cheese product" is intended to encompass processed cheese, cheese food, cheese spread, or similar blends of varieties of cheese which are plastic or semiplastic at elevated temperatures. Preferably, I use a cheese formulation having an analysis of about 40 to 60% moisture, 20 to 30% fat and a pH of about 5.0 to 6.2. The preferred formulations are made principally of Swiss or Cheddar or American or a blend of American and Bleu cheese along with the usual amounts of emulsifier, salt, color and flavoring ingredients, etc. The specific amounts of each cheese utilized will vary greatly from formulation to formulation depending upon the flavor, texture, body, age, analysis and the like of each variety. Other cheeses such as Provalone, Mozzarella, Cottage Cheese, etc., can also be used. It is well recognized in the cheese art that even cheeses of the same type or variety have differing flavor, body, age, texture characteristics and analysis from batch to batch. Hence, the preferred formulation is prepared by blending the preferred varieties in such amounts which will provide a uniform composition of the preferred analysis and will result in a final product exhibiting the superior texture and appearance characteristics described hereinabove after being processed in accordance with the instant invention.

As used in the subject specification and claims, the term, "shock cooling" is intended to mean cooling the product at a rate of 3° to 20°F. per minute from about 40° to 60°F., the extrusion temperature, to about 10° to 30°F. Preferably, the cooling rate should be from 5° to 10°F. per minute.

The above and other objects and advantages will become apparent from the following description which illustrates the preferred method of forming a molten cheese mixture, cooling and extruding the molten cheese mixture in the form of a cheese rope, slicing the cheese rope into bite-size pieces and wrapping the pieces so that the flat surfaces thereof are not obstructed by the twisted ends of the wrapper.

DESCRIPTION OF THE PREFERRED EMBODIMENT

In carrying out the preferred embodiment of the subject invention, the cheese product is preferably prepared in a conventional manner. A typical cheese composition suitable for use in the subject invention includes the following:

| | |
|---|---|
| Cheddar Cheese | 70.13% |
| Skim Milk Conc. 40% solids | 16.50% |
| Steam Cond. | 6.40% |
| Dry Sweet Whey | 3.00% |
| Sodium Citrate | 1.88% |
| Salt | .75% |
| Added Water | .50% |
| Sodium Hexametaphosphate | .50% |
| Sorbic Acid | .20% |
| Citric Acid | .10% |
| Plastic Cream | .05% |

The cheese composition, such as above, is formed by adding ingredients thereof to a stainless steel kettle and heating it to the point when it becomes molten. This temperature should be high enough to pasteurize the cheese composition.

Specifically, the molten cheese mixture will normally be heated to a temperature in the range of 155° to 175°F. At these temperatures, the cheese composition is in a substantially molten form and prior to further treatment, according to the subject invention, must be cooled to a temperature in the range of 40° to 60°F. Although many different types of cooling means can be used, the product is preferably cooled in a scraped surface heat exchanger which is well-known in the art. Preparation of the molten cheese composition is described in the Foster et al U.S. Pat. No. 3,761,284 which is hereby incorporated by reference as to all of its disclosure relating to preparation of the molten cheese composition and its subsequent extrusion.

After being cooled to somewhere in the range of 40° to 60°F., the composition is directed through an extrusion head to form it into an elongated rope having the desired cross-sectional shape and size. The particular cross-sectional shape and size produced depends upon the particular final size of the product desired. Typically, however, the rope or product will be of generally circular cross-section and have a diameter of about ½178 to 1½ inches and the length will be in the range of 10 to 12 inches.

It is necessary that the extrusion head or nozzle be jacketed and constructed such that water or other heat exchange fluid at various temperatures can be pumped through separate sections of the head. The arrangement should be such that the main body of the extrusion head can be maintained at a temperature in the range of 90° to 110°F. The outlet end or throat should have a temperature in the range of 100° to 140°F. The temperature of the extrusion head performs the function of oiling off the extruded composition. That is, the heat applied to the cheese composition causes oil to be released and the surface to become slippery. The slippery surface thus formed provides an extremely smooth extrusion of the cheese rope.

After being extruded into the rope or bar form, it may be pre-cooled to case-harden the cheese rope in a pre-cooling tunnel maintained at −10° to 0°F. This is required with some cheese compositions to make the surface non-sticky which facilitates further handling of the cheese rope. Pre-cooling can be accomplished in many ways, however, in the subject embodiment, a pre-cooling tunnel is cooled in any convenient manner such as through the use of liquid $CO_2$, liquid nitrogen or refrigerated air released in the tunnel.

After being pre-cooled, the cheese rope is shock cooled or quickly cooled to a preferred temperature in the range of 18° to 22°F. This shock-cooling can be effected in many ways, however, in the subject embodiment, the product is shock-cooled by passing through the main cooling tunnel wherein a suitable refrigerant, such as liquid $CO_2$, is directed against the cheese rope. As the liquid $CO_2$, is sprayed in the main cooling tunnel, it vaporizes to release frigid gas which envelops the cheese rope and instantaneously reduces the temperature of the outer surface thereof. Internal substance of the cheese rope is cooled by conduction with a thermal gradient at the exit of about 5° to 20°F. This temperature change forms the desired surface characteristics for wrapping as well as the desired internal characteristics for cutting the cheese rope into small pieces quickly and efficiently. Cold air at as low as −40°F. can also be used as a refrigerant. As noted earlier, the shock-cooling should be carried out such that the temperature of the product is dropped from the extrusion range of 40° to 60°F. to the range of 10° to 30°F at a rate of 3° to 20°F./minute.

In the subject embodiment, circular one-inch diameter cheese rope can be cooled at the required rate by passing through the main cooling tunnel maintained in a range of −110° to 0°F. It should, of course, be understood that the effective desirable operating temperature of the cooling tunnels depends upon the particular product being cooled, its cross-sectional size and shape, and the speed at which it passes through the tunnel. Using the sample formula shown earlier, cooling cheese rope 1 inch in diameter from about 50° to 20°F. takes 5 to 6 minutes with the cooling tunnel at −50°F.

When the cheese rope exits from the tunnel, it has a frozen, semi-rigid consistency which does not distort. The cheese rope is still slightly pliable, is not sticky and the consistency and the hardness thereof are such that it can be cut and wrapped at a high rate of speed in a conventional kiss-wrap machine of the type used for wrapping candy kisses and similar products. A suitable machine for the cutting and wrapping is a Forgrove 42CW Candy Twist Wrap Machine, which is available on the market. Although the cheese rope must be rigid before it is fed to the wrapping machine, it must not be so rigid so as to crumble when it is subjected to the high-speed slicing.

With the use of the wrapping machine noted in the previous paragraph at the conditions described herein, less than 1% of cheese product is improperly wrapped to require manual rewrapping whereas with cooling overnight in a freezer, this failure rate was as high as 50%. These figures should point out the criticality of the parameters and product characteristics described herein.

The frozen, shock-cooled cheese rope which is about 1 inch in diameter, is fed to the kiss wrap machine which cuts the rope into desired length, typically ¾ inch in length, and twist-wraps them in wrapping paper or film at a rate of several hundred per minute, up to 600 per minute. In wrapping the cheese product, mechanical fingers pick each individual piece and turn it 90° or so that when the wrapping film is applied, the twisted ends protrude along the vertical axis of the cheese product and not from the flat surfaces thereof. The twist-wrapping operation is characterized by filling seats or pockets of a 10-inch diameter ferris wheel with pieces of cheese rope which are obtained by slicing the cheese rope into individual pieces by means of a guillotine knife in the form of a rotary blade. The pieces of cheese rope are deposited into the pockets of the revolving ferris wheel by a push rod operated in synchomism therewith. These cheese pieces are disposed in the pockets in such a way that the flat, cut surfaces are exposed and face the sides of the ferris wheel with their horizontal axis in parallel relationship to the horizontal axis or axis of rotation of the ferris wheel. After revolving about half a turn, another push rod transfers each cheese piece into a pocket of another ferris wheel disposed about 90° or perpendicularly to the first ferris wheel. Before the cheese piece has been deposited into the pocket of the second ferris wheel, a small piece of paper is placed therein to receive the cheese piece. As the second ferris wheel revolves, a pair of fingers on each side of the second ferris wheel take a hold of the ends of paper and spin perhaps 3 times to form the twist ends which protrude along an axis through the outer rounded surface of the cheese piece leaving the flat, cut surfaces unobstructed. The twist-wrapped cheese pieces are subsequently pushed out of the pockets and slide onto a belt for further packaging.

EXAMPLE I

The mixture for the following mild cheese product batch was 15.0% 6 months old Cheddar and 55.13% 60-day Forced Cured American — total 70.13% of formula. The ground cheese in the amount indicated in the formula was added to a scraped surface stainless steel kettle, followed by the rest of the ingredients shown in the formula above. During the latter part of this addition, steam injection was started which added the amount of water indicated in the formula from this source. The entire cheese batch was heated to 162°F and was then pumped by a Waukesha pump to the hopper of a Moyno pump. This Moyno pump was used to pump the product through a scraped surface heat exchanger. The pump pressure developed was 500 pounds. After exiting from the scraped surface heat exchanger, the product went through an in-line agitating mixer. This mixer is used sometimes to change the texture characteristics of the product by working the mass so that the end product has the desired texture. The amount of agitation depends upon the particular characteristics of the initial cheese used. After this, the rope was extruded with a temperature of 95°F on the extruded head and 143°F on the nozzle. The temperature of the rope itself was 57°F. The rope then passed through the cooling tunnel maintained at −44°F. Five and one-half minutes later, when the rope exited from the tunnel, it had a core temperature of 15°F. From here, the rope was fed to a twist-wrap machine where it was cut, twist wrapped and subsequently the twist-wrapped pieces were gas-packed in pouches.

EXAMPLE II

Tangy cheese product consisted of 45% 12 month old Cheddar and 25.13% 10–30 Current American, total 70.13% of the formula. The ground cheese in the amount indicated in the formula was added to a scraped surface stainless steel kettle, followed by the rest of the ingredients shown in the formula above. During the latter part of this addition, steam injection was started which added the amount of water indicated in the formula from this source. The entire cheese batch was heated to 158°F and was then pumped by a Waukesha pump to the hopper of a Moyno pump. This Moyno pump was used to pump the product through a scraped surface heat exchanger. The pump pressure developed was 380 pounds. After exiting from the scraped surface heat exchanger, the product went through an in-line agitating mixer. After this, the rope was extruded with a temperature of 92°F on the extruder head and 146°F on the nozzle. The temperature of the rope itself was 55°F.

The rope then passed through the cooling tunnel maintained at −55°F. Five and one-half minutes later, when the rope exited from the tunnel, it had a core temperature of 16°F. From here, the rope was fed to a twist-wrap machine where it was cut, twist wrapped and subsequently the twist-wrapped pieces were gas-packed in pouches.

What I claim is:

1. A method of making a packaged cheese product comprising preparing a molten cheese composition, cooling the molten cheese composition to a temperature of 40° to 60°F, extruding the cheese composition in the form of cheese rope which holds its shape, rapidly cooling the cheese rope to a temperature of 10° to 30°F, cutting the cheese rope into cheese pieces of about ¼ to 1½ inches in length following the cooling step, and wrapping each cheese piece in a suitable wrapping material on a high speed wrapping machine.

2. Method of claim 1 wherein the cheese rope is cooled to a temperature of 15° to 22° F at a rate of about 3° to 20° F per minute and the cutting and wrapping steps are carried out at a rate of several hundred cheese pieces per minute.

3. Method of claim 1 wherein the cheese rope is cooled to a temperature of 15° to 22° F and the cutting and wrapping steps are carried out at a rate of several hundred cheese pieces per minute.

4. Method of claim 1 wherein the cheese rope is cooled at a rate of about 5° to 10° F per minute to a temperature of 15° to 22° F.

5. Method of claim 1 wherein the cheese rope is cylindrical, the cheese pieces are of bite size and the wrapping step is accomplished by disposing each cheese piece on a wrapper in a separate pocket of a rotating device with horizontal axis of each piece disposed parallel to the axis of rotation of the rotating device, revolving each cheese piece through about 90°, enveloping each cheese piece in a separate wrapper and twisting the ends of the wrapper.

6. Method of claim 1 wherein the cheese rope is cylindrical, the cheese pieces are of bite size, the cheese rope is rapidly cooled at sub-zero temperature on the Fahrenheit scale and the step of wrapping is accomplished by placing a wrapper in a pocket of a revolving device, disposing a cheese piece on the wrapper in the pocket, enveloping the cheese piece in the wrapper and twisting the ends of the wrapper.

7. Method of claim 6 wherein the cheese composition is extruded through an extrusion head provided with an oiling section at the outlet end of the extrusion head and wherein major proportion of the cheese composition is selected from Swiss, Cheddar, American and mixtures of such cheeses, the method also including the step of heating the oiling section to render the cheese composition slippery.

8. Method of claim 7 including the steps of maintaining the extrusion head at 90° to 110°F and the oiling section at 100° to 140°F, the cheese rope being cylindrical in cross-section of a diameter of up to about 2 inches.

* * * * *

UNITED STATES PATENT OFFICE
CERTIFICATE OF CORRECTION

Patent No. 3,966,970 Dated June 29, 1976

Inventor(s) Murray John Williams

It is certified that error appears in the above-identified patent and that said Letters Patent are hereby corrected as shown below:

Col. 3, line 11, after "1/2" delete "178"

Signed and Sealed this

Twenty-sixth Day of October 1976

[SEAL]

Attest:

RUTH C. MASON
*Attesting Officer*

C. MARSHALL DANN
*Commissioner of Patents and Trademarks*